(12) United States Patent
Cho et al.

(10) Patent No.: US 7,400,437 B2
(45) Date of Patent: Jul. 15, 2008

(54) DISCRETELY CONTROLLED MICROMIRROR WITH MULTI-LEVEL POSITIONS

(75) Inventors: Gyoung Il Cho, Seoul (KR); Dong Woo Gim, Gyoungnam (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 3 days.

(21) Appl. No.: 11/549,954

(22) Filed: Oct. 16, 2006

(65) Prior Publication Data

US 2007/0064301 A1 Mar. 22, 2007

Related U.S. Application Data

(62) Division of application No. 10/872,241, filed on Jun. 18, 2004.

(51) Int. Cl.
*G02B 26/00* (2006.01)

(52) U.S. Cl. ............... 359/291; 359/290; 359/292; 359/295

(58) Field of Classification Search ........... 359/291, 359/290, 237, 292, 295, 298
See application file for complete search history.

(56) References Cited

U.S. PATENT DOCUMENTS

| | | | |
|---|---|---|---|
| 2,002,376 A | 5/1935 | Mannheimer | |
| 4,407,567 A | 10/1983 | Michelet | |
| 4,834,512 A | 5/1989 | Austin | |
| 4,944,580 A * | 7/1990 | MacDonald et al. | ........ 359/849 |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A | 3/1997 | Vogeley | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A | 2/2000 | Michaliek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,282,213 B1 | 8/2001 | Gutin | |
| 6,315,423 B1 | 11/2001 | Yu | |
| 6,329,737 B1 | 12/2001 | Jerman | |

(Continued)

FOREIGN PATENT DOCUMENTS

JP 08-043881 2/1996

(Continued)

*Primary Examiner*—Ricky L Mack
*Assistant Examiner*—Brandi N Thomas

(57) ABSTRACT

This invention provides the two types of Discretely Controlled Micromirror (DCM), which can overcome disadvantages of the conventional electrostatic micromirrors. The first type micromirror is a Variable Supporter Discretely Controlled Micromirror (VSDCM), which has a larger displacement range than the conventional electrostatic micromirror. The displacement accuracy of the VSDCM is better than that of the conventional electrostatic micromirror and the low driving voltage is compatible with IC components. The second type of DCM, the Segmented Electrode Discretely Controlled Micromirror (SEDCM) has same disadvantages with the conventional electrostatic micromirror. But the SEDCM is compatible with known microelectronics technologies.

26 Claims, 7 Drawing Sheets

U.S. PATENT DOCUMENTS

| | | | |
|---|---|---|---|
| 6,498,673 | B1 | 12/2002 | Frigo |
| 6,507,366 | B1 | 1/2003 | Lee |
| 6,549,730 | B1 | 4/2003 | Hamada |
| 6,625,342 | B2 | 9/2003 | Staple |
| 6,649,852 | B2 | 11/2003 | Chason |
| 6,650,461 | B2 | 11/2003 | Atobe |
| 6,658,208 | B2 | 12/2003 | Watanabe |
| 6,711,319 | B2 | 3/2004 | Hoen |
| 6,741,384 | B1 | 5/2004 | Martin |
| 6,784,771 | B1 | 8/2004 | Fan |
| 6,833,938 | B2 | 12/2004 | Nishioka |
| 6,885,819 | B2 | 4/2005 | Shinohara |
| 6,900,901 | B2 | 5/2005 | Harada |
| 6,900,922 | B2 | 5/2005 | Aubuchon |
| 6,906,848 | B2 * | 6/2005 | Aubuchon ................ 359/291 |
| 6,906,849 | B1 | 6/2005 | Mi |
| 6,914,712 | B2 | 7/2005 | Kurosawa |
| 6,919,982 | B2 | 7/2005 | Nimura |
| 6,934,072 | B1 | 8/2005 | Kim |
| 6,934,073 | B1 | 8/2005 | Kim |
| 6,943,950 | B2 | 9/2005 | Lee |
| 6,958,777 | B1 | 10/2005 | Pine |
| 6,970,284 | B1 | 11/2005 | Kim |
| 6,971,116 | B2 * | 11/2005 | Takeda et al. ............... 720/718 |
| 6,995,909 | B1 | 2/2006 | Hayashi |
| 6,999,226 | B2 | 2/2006 | Kim |
| 7,023,466 | B2 | 4/2006 | Favalora |
| 7,031,046 | B2 | 4/2006 | Kim |
| 7,046,447 | B2 | 5/2006 | Raber |
| 7,068,416 | B2 | 6/2006 | Gim |
| 7,077,523 | B2 | 7/2006 | Seo |
| 7,161,729 | B2 | 1/2007 | Kim |
| 2002/0018407 | A1 | 2/2002 | Komoto |
| 2002/0102102 | A1 | 8/2002 | Watanabe |
| 2002/0135673 | A1 | 9/2002 | Favalora |
| 2003/0058520 | A1 | 3/2003 | Yu |
| 2003/0071125 | A1 | 4/2003 | Yoo |
| 2003/0174234 | A1 | 9/2003 | Kondo |
| 2003/0184843 | A1 | 10/2003 | Moon |
| 2004/0009683 | A1 | 1/2004 | Hiraoka |
| 2004/0012460 | A1 | 1/2004 | Cho |
| 2004/0021802 | A1 | 2/2004 | Yoshino |
| 2004/0052180 | A1 | 3/2004 | Hong |
| 2004/0246362 | A1 | 12/2004 | Konno |
| 2004/0252958 | A1 | 12/2004 | Abu-Ageel |
| 2005/0024736 | A1 | 2/2005 | Bakin |
| 2005/0057812 | A1 | 3/2005 | Raber |
| 2005/0136663 | A1 | 6/2005 | Gan |
| 2005/0174625 | A1 | 8/2005 | Huiber |
| 2005/0180019 | A1 | 8/2005 | Cho |
| 2005/0212856 | A1 | 9/2005 | Temple |
| 2005/0224695 | A1 | 10/2005 | Mushika |
| 2005/0225884 | A1 | 10/2005 | Gim |
| 2005/0231792 | A1 | 10/2005 | Alain |
| 2005/0264870 | A1 | 12/2005 | Kim |
| 2005/0275929 | A1 * | 12/2005 | Kim et al. ................ 359/291 |
| 2006/0012766 | A1 | 1/2006 | Klosner |
| 2006/0012852 | A1 | 1/2006 | Cho |
| 2006/0028709 | A1 | 2/2006 | Cho |
| 2006/0187524 | A1 | 8/2006 | Sandstrom |
| 2006/0209439 | A1 | 9/2006 | Cho |

FOREIGN PATENT DOCUMENTS

| | | |
|---|---|---|
| JP | 11-069209 | 3/1999 |
| JP | 2002-288873 | 10/2002 |

* cited by examiner

DISCRETELY CONTROLLED MICROMIRROR WITH MULTI-LEVEL POSITIONS

REFERENCE TO RELATED APPLICATION

This application is a divisional of co-pending U.S. patent application Ser. No. 10/872,241 filed Jun. 18, 2004, and incorporated by reference herein.

FIELD OF INVENTION

The present invention relates to a micromirror device with discrete multi-level positions.

BACKGROUND OF THE INVENTION

Micromirror devices have been developed because it can substitute for conventional optoelectronic devices. A phase-only piston-style micromirror was used for phase adaptive optics applications and a rotational micromirror was used to deflect a light. Most of these micromirrors have been controlled to have continuous displacements, which are determined at the equilibrium between electrostatic force and elastic force. The analog control is more complex than the digital or discrete control, and is not compatible with known semiconductor electronics technologies such as MOS, CMOS, etc. In addition, the micromirrors with continuous displacement actuated by electrostatic force undergo the classical snap-down phenomenon when the electric force exceeds the elastic force of mechanical structure. The snap-down phenomenon limits the translational and rotational ranges of a micromirror.

The high driving voltage is also another acute disadvantage in practical use of the micromirrors with continuous displacement actuated by electrostatic force. To be compatible with IC components, it is desired that micromirrors are operated at low voltage which is compatible with the circuit operation or control voltage.

In the prior art of micromirror array like Digital Micromirror Device in U.S. Pat. Nos. 4,566,939, 5,083,857, and 6,232,936, each micromirror is actuated by digital control of a voltage. It has large rotation, has a low driving voltage, and is compatible with known semiconductor electronics technologies. But, it has only single degree of freedom; rotation about an axis and two level positions. So, the micromirror array is merely the array of optical switches.

To be applied more widely, a micromirror is needed to have multi-level position control and large displacements, multi degrees of freedom motions, low driving voltage, and compatibility with known semiconductor electronics technologies.

SUMMARY OF THE INVENTION

The present invention contrives to solve the disadvantages of conventional micromirror devices with continuous displacement actuated by electrostatic force and limitations of Digital Micromirror Device (DMD).

An objective of the invention is to provide a micromirror with accurate and fast multi-level position control.

Another objective of the invention is to provide a micromirror with multi-degree-of-freedom motions.

Still another objective of the invention is to provide a micromirror with large displacements.

Still another objective of the invention is to provide a micromirror with very short settling time.

Still another objective of the invention is to provide a micromirror with low driving voltage compatible with known IC circuits operation or control voltage of IC circuits.

The conventional electrostatic micromirrors undergo the classical snap-down phenomenon when the electric force exceeds the elastic force due to mechanical structure. The snap-down phenomenon limits the translational and rotational ranges of a micromirror. The slow settling time of the conventional electrostatic micromirror reduces the operating speed of the micromirror. And, the high driving voltage of the conventional electrostatic micromirror gives difficulties in practical use. To be compatible with IC components which are normally operated at 5V or less than 5V and to prevent the electrical breakdown due to high electric field, the maximum value of the driving voltage should generally be as low as possible. Low displacement accuracy is also acute disadvantage of the conventional electrostatic micromirrors. The displacement accuracy goes bad by $n^3$ times as spring thickness variation increases n times. To solve those disadvantages of the conventional electrostatic micromirrors, the Discretely Controlled Micromirror (DCM) is invented.

The first type of the DCM is the Variable Support Discretely Controlled Micromirror (VSCDM), which uses supports controlling gaps between the micromirror and substrate. The supports are located under the micromirror. Displacements of the DCM are determined by combinations of gaps, which are determined by the supports where the micromirror rests. The gaps determined by supports are controlled by electrostatic force and the micromirror rests on the controlled supports by an attractive electrostatic force. Digital voltage or discrete voltage operation is preferable method to control the electrostatic force. Therefore, combinations of gaps determine translation and rotation of the micromirror.

Three preferred VSDCM embodiments are explained. The first preferred embodiment is a micromirror comprising one or more digital supports. A gap that each support provides has two values because the gap is determined by bistable motion of the support. The motion is controlled by electrostatic force. Digital voltage or discrete voltage operation is preferable method to control the electrostatic force. The VSDCM uses bistable displacements of the supports for the displacement control of the micromirror.

The second preferred embodiment is a micromirror comprising one or more multi-level supports. A gap that each support provides has discrete multi-step because the gap is determined by discrete height change of the support. The height change is controlled by electrostatic force. Digital voltage or discrete voltage operation is preferable method to control the electrostatic force. The VSDCM uses the discrete height change of the supports for the displacement control of the micromirror.

The third preferred embodiment is a micromirror comprising one or more multi-position supports. In-plane position supporting the micromirror is controlled to be changed by the multi-position supports. Because the displacements of the micromirror are determined by not only heights of the supports but also the supporting positions, multi-position supports can control the displacements of the micromirror.

For the conventional electrostatic micromirror, the spring thickness accuracy of the micromirror determines displacement accuracy. The spring stiffness error of thin spring is higher than the spring stiffness error of thick spring if they have the same thickness error. Therefore, it is difficult to use low driving voltage because thin spring is undesirable. Because the VSDCM uses bistable or discrete displacement, spring thickness accuracy is not critical. Therefore, the spring of the micromirror with very low stiffness can be used. The VSDCM with the spring of low stiffness can be operated by low voltage. Independently controlled variable supports require individually addressable electronics. To achieve this, the micromirror combined with on-chip electronics is used. In order to do this, wafer-level integration of the micromirror with known semiconductor microelectronics is used.

Because the micromirror rests on the variable supports of the VSDCM, thickness accuracy of the variable supports is the displacement accuracy of micromirror. The VSDCM has much better accuracy for large displacement because the accuracy is not dependent on the range of displacement.

The second type of DCM is the Segmented Electrode Discretely Controlled Micromirror (SEDCM), which uses the segmented electrode pads. The SEDCM has the same disadvantages like small displacement range and poor accuracy for large displacement as the conventional electrostatic micromirrors do. But, The SEDCM is compatible with known semiconductor microelectronics technologies because the SEDCM can be controlled by discrete voltage. Displacements of the micromirror can be controlled by appropriate combinations of area size, position, and voltage of each electrode pad.

The VSDCM and the SEDCM can be fabricated with two different methods. The first method uses metals; aluminum, nickel, gold, and copper for structural layer, and photoresist or $SiO_2$ for the sacrificial layers that forms the air gaps. The fabrication of the DCM begins with a wafer on which a completed semiconductor microelectronics circuit is fabricated. A thick oxide is deposited over metal of the semiconductor microelectronics and then planarized using known polishing methods such as chemical mechanical polishing (CMP) techniques and so on. The polishing step provides a completely flat surface for the digital structure. The CMP ensures that thickness variation, flatness and reflectivity of micromirrors are not degraded. Through the use of several photomask layers, the structure of micromirrors is formed with metal layers for the spring, posts, and micromirror layer. And the air gap of DCM is formed by known sacrificial materials such as photoresist or $SiO_2$. A metal is sputter-deposited or evaporated and plasma-etched by using plasma-deposited $SiO_2$ as the etch mask. Later in the packaging flow, the sacrificial layers are plasma-ashed to form the air gaps.

The second method uses known electroplating techniques. This method utilizes a sacrificial metallic mold, which plays multiple roles of an electroplating mold for posts and seed layers for next-level electroplating at the same time. Therefore, this method can simplify the fabrication process and demonstrate real 3-D metallic microstructures without limitation on the number of levels. This method only uses conventional lithography and electroplating, and known polishing such as CMP. As an example, electroplated nickel is used for structural layers and electroplated copper is used for sacrificial layers, respectively.

The reflective surface of the micromirror is made of metal, metal compound, multi-layered dielectric material, or other materials with high reflectivity. Many known microfabrication processes can make the surface of the micromirror to have high reflectivity. The micromirrors are electrostatically controlled to have desired positions with actuating components. According to applications, a translation, a rotation, a translation and a rotation, or a translation and two rotations can be controlled.

As described in the applicant's U.S. Patent Application for "Variable Focal Length Lens Comprising Micromirrors with Two Degrees of Freedom Rotation", which was filed on May 27, 2004, applicant's another U.S. Patent Application for "Variable Focal Length Lens Comprising Micromirrors with Two Degrees of Freedom Rotation and One Degree of Freedom Translation" which was filed on May 27, 2004, and the applicant's still another U.S. Patent Application for "Array of Micromirror Array Lenses", which was filed on May 28, 2004, the disclosures of which are incorporated by reference as if fully set forth herein, the micromirror array comprising the micromirrors with two degrees of freedom rotation or two degrees of freedom rotation and one degree of freedom translation which are controlled independently can modulate incident lights arbitrarily. In order to do this, it is required that incident lights are deflected to a desired arbitrary direction by controls of two degrees of freedom rotation or controls of two degrees of freedom rotation and one degree of freedom translation. Independent translation of each micromirror is also required to satisfy the phase condition. Because the DCM have many advantages and can have two degrees of freedom rotation and/or one degree of freedom translation, the micromirror array comprising the DCM has better performance than the conventional micromirror array.

Electric circuits to operate the micromirror array can be replaced with known MOS or CMOS technologies, which are widely used in microelectronics. By applying the microelectronics circuits under the micromirror array, the effective reflective area can be increased by removing necessary area for electrode pads and wires. Each micromirror can tilt along two axes as well as retract. As a result the micromirror can scan a field of view along both vertical and horizontal axes and simultaneously retract or elevate to remove phase aberrations of an incident optical beam. The micromirror array can correct aberration, e.g. optical effects due to the medium between the object and its image or defects of a lens system that cause its image to deviate from the rules of paraxial imagery, by controlling each micromirror independently. To compensate for aberration with arbitrary phase error, each micromirror of micromirror array should be controlled independently. Independent control of each micromirror is possible by replacing electric circuits required for control with known CMOS technologies and fabricating the CMOS underneath the micromirrors using known microfabrication methods.

The micromirrors of the invention are desirably shaped to permit a closely packed array and can be rounded in shape but desirably are angular, e.g. triangular, rectangular or have five or more sides, including hexagonal, octagonal and the like.

In order to achieve the above objectives, the first type of the present invention provides a discretely controlled micromirror (DCM) that includes a micromirror and a plurality of variable supports on which the micromirror rests. The variable supports determine the position of the micromirror, and the variable supports are controlled by electrostatic force. Digital voltage or discrete voltage operation is preferable method to control the electrostatic force. The variable supports are located under the micromirror. In-plane position of the variable supports is variable to get arbitrary displacements of the micromirror from digital or discrete variable supports.

The variable supports are placed between the micromirror and a substrate. Each of the variable supports is controlled to change its height so that the position of the micromirror is controlled.

The variable supports determine the gap between the micromirror and the substrate.

Each of the digital supports comprises a top post, a bottom post, and/or one or more inserter that is inserted between the top post and the bottom post in its on position and taken out from the gap between the top post and the bottom post in its off position.

The gap is determined by whether the inserter is placed between a top post and a bottom post.

Each of the discrete supports comprises a top post, a bottom post, and/or one or more multi-step inserter that is inserted between the top post and the bottom post. The inserter with multi-step thickness determines displacements of the micromirror according to the inserted amount.

The gap is determined by the inserted amount of the multi-step inserter.

The inserter is controlled by electrostatic force.

The inserter is controlled by digital voltage or discrete voltage operation.

The inserter has in-plane translation. The in-plane translation is actuated by a comb-drive.

The inserter has multi-step thickness.

The in-plane positions of the variable supports are changed.

In the operation of DCM, the rotation and/or translation of the micromirror is controlled. Both rotation and translation of the micromirror are controlled by three or more than three variable supports. The variable support has bistable motion. The variable support has discrete motion. The micromirror rests on the controlled variable support by attractive force.

The surface material of the micromirror is the one with high reflectivity. The surface material of the micromirror may be metal or metal compound. Also the surface of the micromirror is made with multi-layered dielectric coating.

The DCM is made by a method in which the material of a structural layer is metal. An aluminum layer is sputter-deposited and plasma-etched using plasma-deposited $SiO_2$ as an etch mask. The sacrificial layers are plasma-ashed to form the air gaps.

The DCM is made by a method in which layers deposited by microfabrication process are planarized using a chemical mechanical polishing (CMP) technique.

In the DCM, the micromirror is fabricated using electroplating techniques. The electroplating technique uses the unique sacrificial metallic mold that plays multiple roles of an electroplating mold for posts and seed layers. Electroplated nickel is used for structural layers. Electroplated copper is used for sacrificial layers.

The invention also provides a DCM array comprising a plurality of the above-described DCM. In the DCM array, the micromirrors are controlled independently. The micromirror array is a Spatial Light Modulator (SLM).

A control circuitry is constructed under the micromirror using microelectronics technologies. A thick oxide is deposited over metal of the microelectronics circuits.

The second type of the invention provides a DCM that includes a micromirror and a plurality of segmented electrodes. The segmented electrodes determine the displacements of the SEDCM. The applied voltage to segmented electrodes is discrete. The SEDCM is controlled by electrostatic force. The SEDCM is controlled by digital voltage or discrete voltage operation. The segmented electrodes are located under the micromirror. In-plane positions of the segmented electrodes are changed.

In the operation of the SEDCM, rotation and/or translation of the micromirror is controlled. The areas of the segmented electrodes are changed. The surface material of the SEDCM has high reflectivity. The surface material of the SEDCM may be metal or metal compound. Also, the surface of the SEDCM is made with multi-layered dielectric coating.

The SEDCM is made by a method in which the material of structural layer is metal. An aluminum layer is sputter-deposited and plasma-etched using plasma-deposited $SiO_2$ as an etch mask. The sacrificial layers are plasma-ashed to form the air gaps.

The SEDCM may be made by a method in which layers deposited by microfabrication process are planarized using a chemical mechanical polishing (CMP) technique.

The micromirror is fabricated using electroplating techniques. The electroplating technique uses the unique sacrificial metallic mold, which plays multiple roles of an electroplating mold for posts and seed layers. Electroplated nickel is used for structural layers. Electroplated copper is used for sacrificial layers.

The invention also provides a DCM array comprising the previously described DCM. In the array, the micromirrors are controlled independently. The micromirror array is a Spatial Light Modulator (SLM). A control circuitry is constructed under the SEDCM using microelectronics technologies. A thick oxide is deposited over metal of the microelectronics circuits.

Although the present invention is briefly summarized, the full understanding of the invention can be obtained by the following drawings, detailed description, and appended claims.

BRIEF DESCRIPTION OF THE FIGURES

These and other features, aspects and advantages of the present invention will become better understood with reference to the accompanying drawings, wherein.

DETAILED DESCRIPTION OF THE INVENTION

Figure 1:
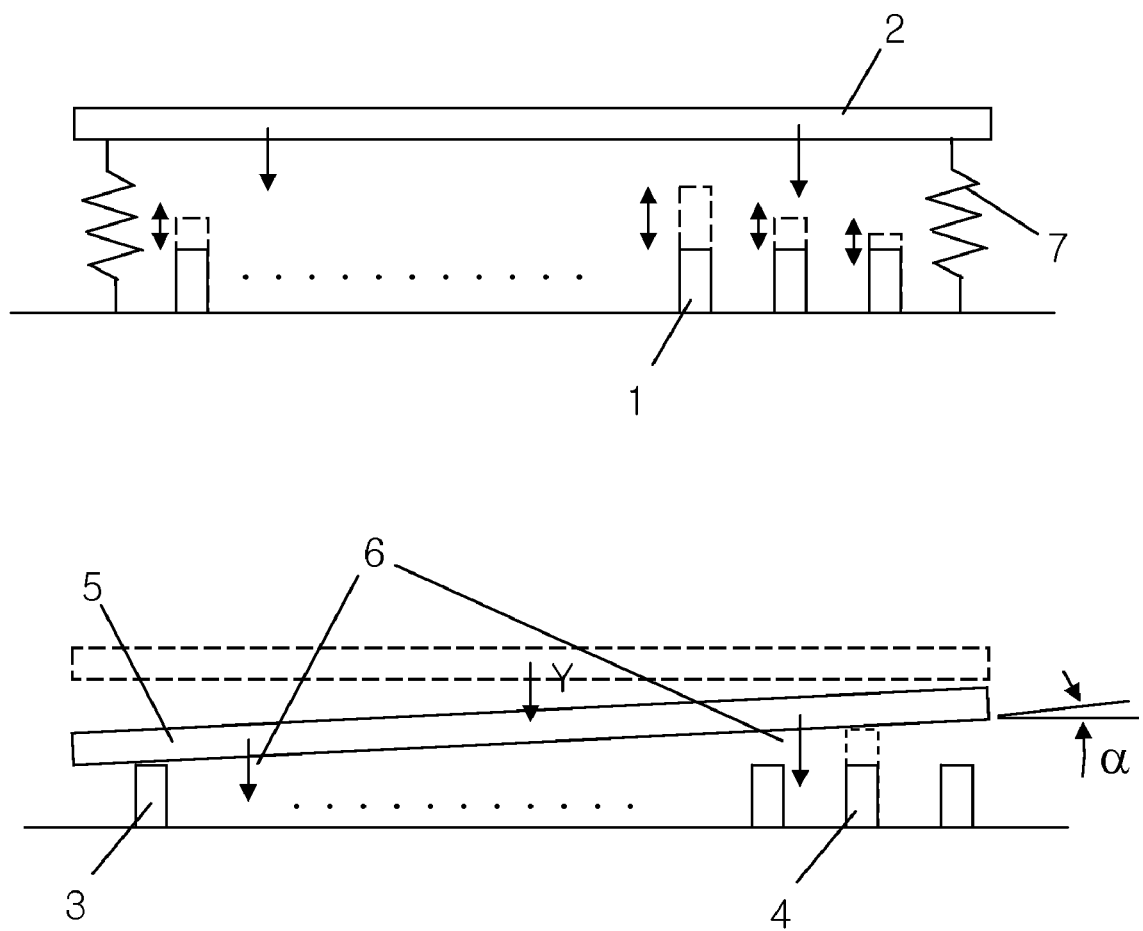
FIG. 1 is a schematic diagram showing the DCM with variable supports.

FIG. 1 shows the concept of DCM with the variable supports 1. The variable support discretely controlled micromirror (VSDCM) use supports 1 providing various gaps between the micromirror 2 and substrate 8. The supports 1 are located under the micromirror 2. Translation and rotation of the VSDCM are determined by combination of the gaps, which are determined by variable supports 3, 4 that the micromirror 5 rests. The gaps determined by the variable supports are controlled digitally or discretely and the micromirror rests on the controlled supports 3, 4 by attractive force 6. Therefore, the gaps provided by the supports determine translation and/or rotation of the micromirror. Gap variation by the supports is determined by digital or discrete motion of the supports and the motions are controlled by electrostatic force. Digital voltage or discrete voltage operation is preferable method to control the electrostatic force. The position of micromirror 5 is restored into initial position by force of flexible spring 7 when the attraction force is off.

Figure 2:
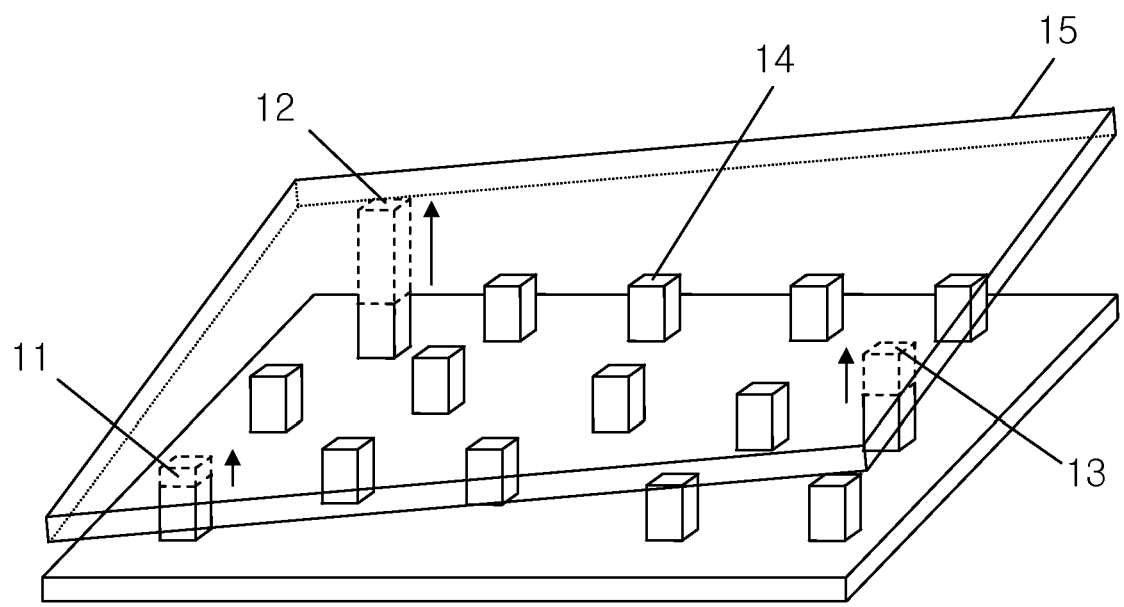
FIG. 2 is a schematic diagram showing how the VSDCM has three degrees of freedom motions; one translation motion along the normal axis to the plane of the micromirror and two rotational motions about the axes in the plane.
Figure 3A:
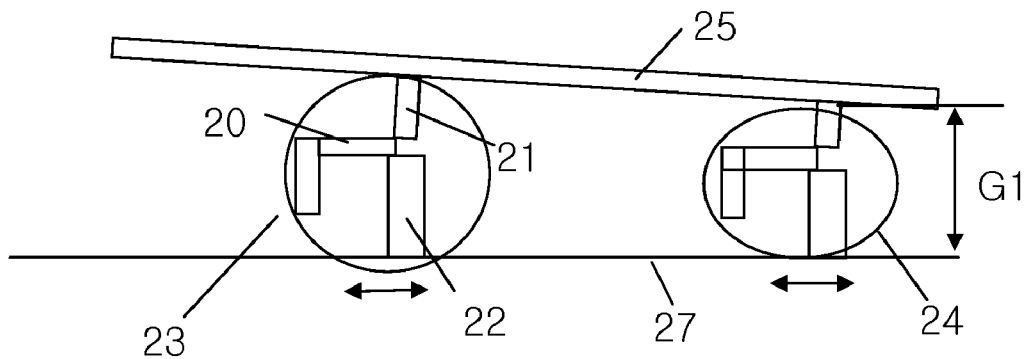
FIGS. 3a-3d are schematic diagrams showing digital variable supports and four different displacements of the DCM comprising the digital variable support.
Figure 3B:
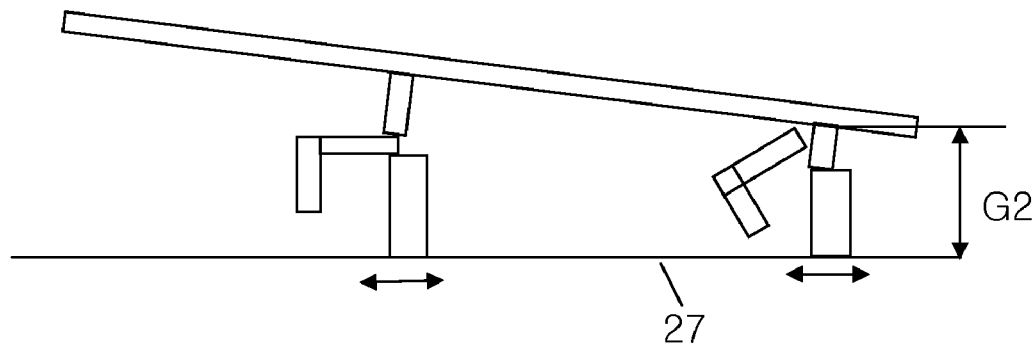
Figure 3C:
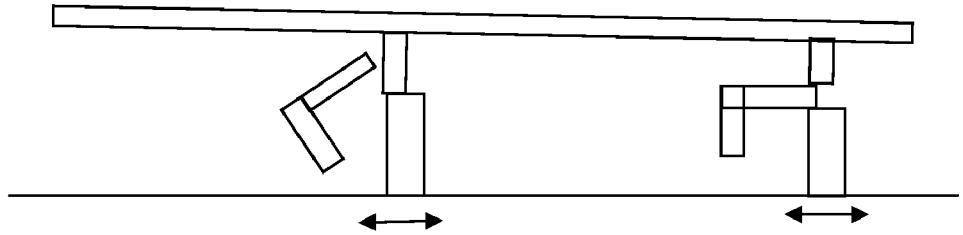
Figure 3D:
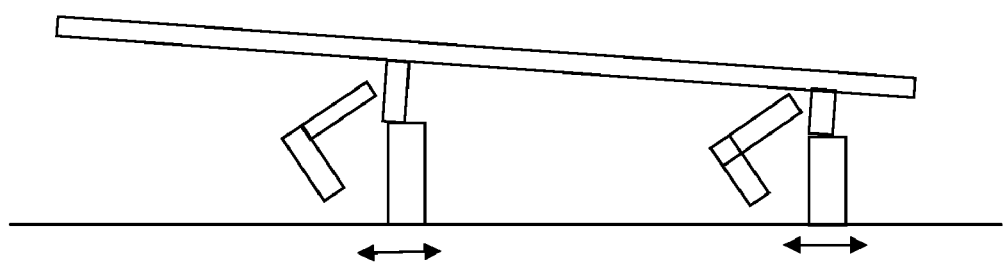

FIG. 2 shows how the VSDCM can have motions of three degrees of freedom; one translational motion along the normal axis to the plane of the micromirror and two rotational motions about the axes in the plane. When three variable supports 11, 12, 13 or more than three variable supports among many variable supports 14 are used to support the micromirror 15, the VSDCM has three degree of freedom. Three variable supports are enough to make three degree of freedom of micromirror, but more than three variable supports can be used so that the micromirror which rests on supports stays stably.

Height accuracy of the variable supports gives the displacement accuracy of the VSDCM because the micromirror 15 rests on the variable supports 11, 12, 13. The thickness control accuracy of microfabrication to make the variable support is less than several nanometers. The displacement accuracy of conventional electrostatic micromirror goes bad by $n^3$ times as spring thickness variation of the micromirror increases n times. Therefore, the VSDCM has much better accuracy in control of displacement than the conventional electrostatic micromirror.

FIGS. 3a-3d show an exemplary digital variable support and four possible displacements of the VSDCM supported by the two variable supports 23, 24.

The variable supports 23, 24 are placed between the micromirror 25 and a substrate 27. Each of the variable supports 23, 24 is controlled to change its height so that the position of the micromirror 25 is controlled.

Even though FIGS. 3a-3d show the digital VSDCM, supported by two variable supports, with two degrees of freedom (one translational motion and one rotational motion), many variable supports can be made under the micromirror and the micromirror, supported by three or more variable supports, with three degrees of freedom (one translational motion and two degrees of rotational motion) is also possible. The variable supports 23, 24 comprise an inserter 20, a top post 21 and/or a bottom post 22. The inserter 20 with bistable motion is controlled by electrostatic force. Digital voltage or discrete voltage operation is preferable method to control the electrostatic force. Each variable support 23, 24 controlled by the electrostatic force can provide controllable two different gaps G1, G2 depending on whether the inserters 20 are inserted or not. The inserter 20, the top post 21 and the bottom post 22 can have different heights because combination of their heights can make various gaps. Each support provides two positions, on-off positions, to a micromirror 25 at the position where the support is located. Since a translation and a rotation of the VSDCM are determined by combinations of the gaps provided by the supports 23, 24 actuation, the number of feasible displacements is $2^n$, where n is the number of supports. At the discrete gaps given by the supports, the micromirror 25 can have desired translation and rotation by adjusting the in-plane position of each support.

Figure 4:
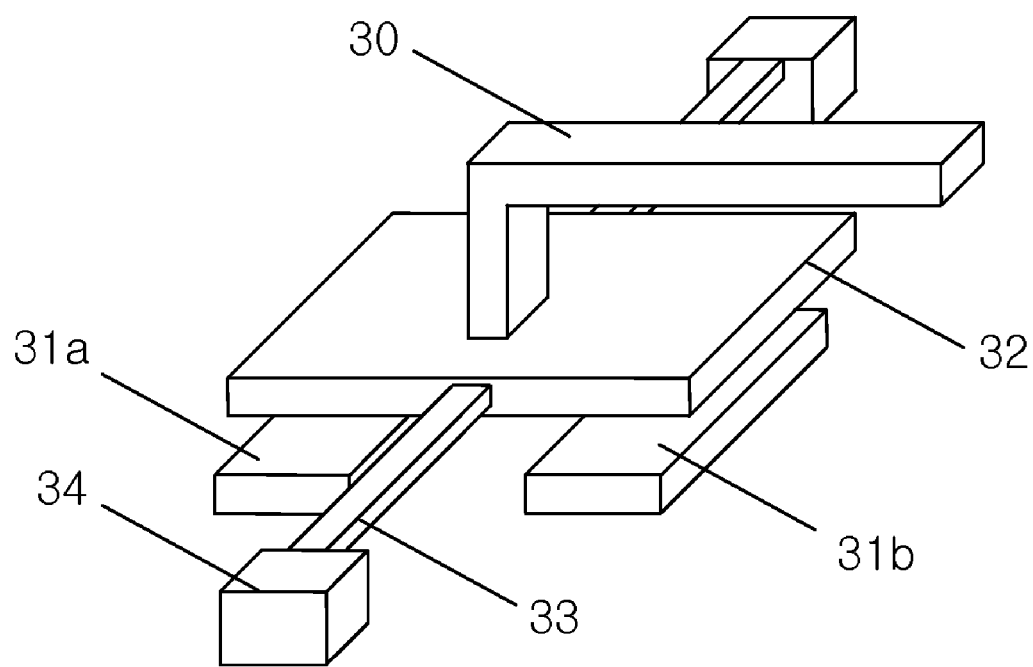
FIG. 4 is a schematic diagram showing an inserter actuating system including inserter.

FIG. 4 shows an example of an inserter actuating system including an inserter 30. The inserter actuating system comprises two bottom electrodes 31a, 31b, a top electrode 32, one or more springs 33, one or more posts 34, and an inserter 30. The top electrode 32 held by the springs 33 is actuated by electrostatic force between the top electrode 32 and one of the bottom electrodes 31a, 31b. In this way, the inserter 30 on the top electrode 32 can be moved.

Figure 5:
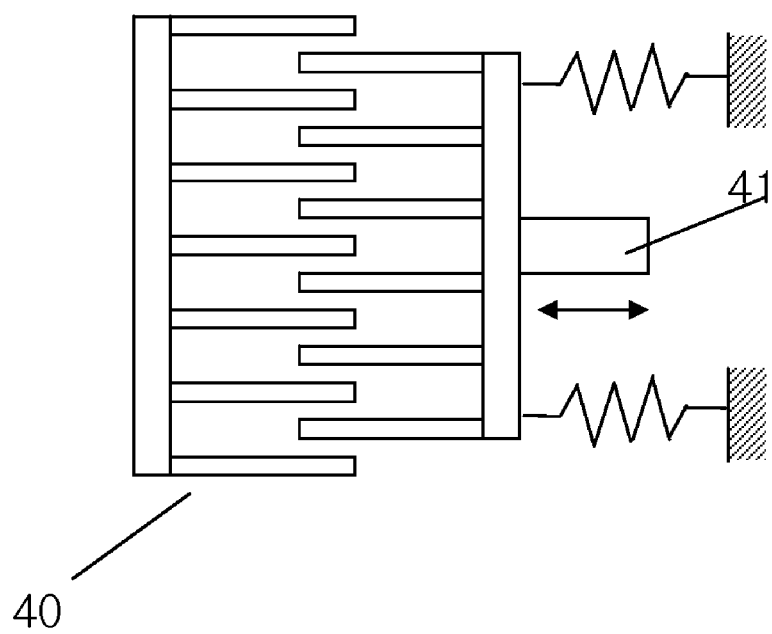
FIG. 5 is a schematic diagram showing an inserter actuating system using a comb-drive.

FIG. 5 shows another example of an inserter actuating system. An inserter 41 should have in-plane translation. A very well-known comb-drive 40 may give in-plane translation to the inserter 41.

Figure 6:
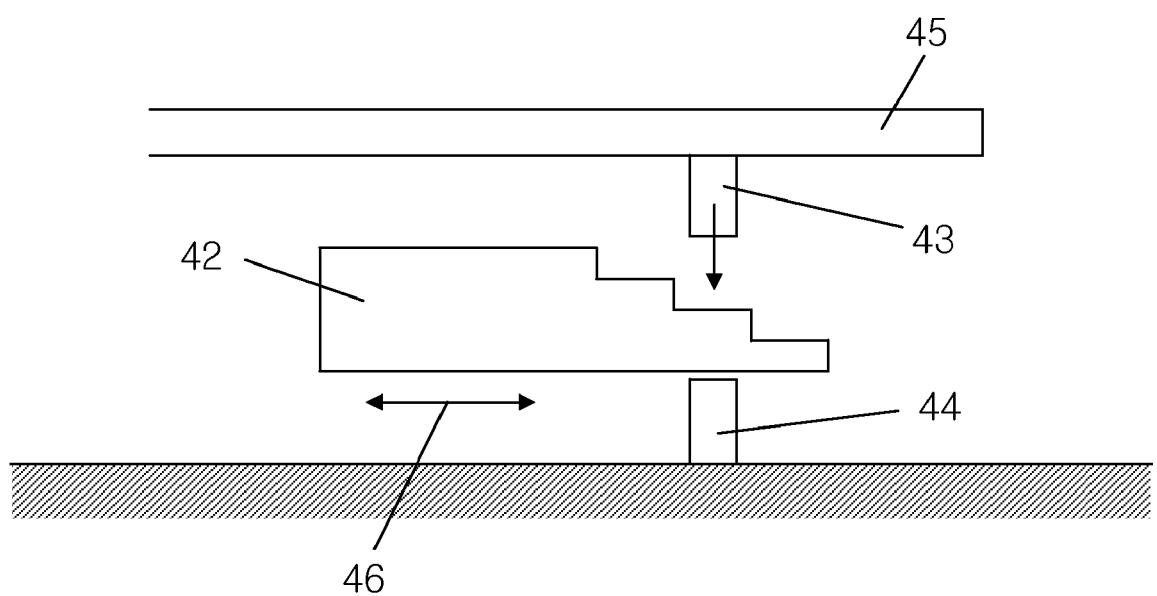
FIG. 6 is a schematic diagram showing a discrete variable support with the multi-step inserter.

FIG. 6 shows a multi-step inserter 42 to make multi-step gaps. In contrast with the inserter 30 with one thickness, the multi-step inserter 42 has several step thicknesses. According to in-plane position of the inserter 42, the thickness of the multi-step inserter located between a top post 43 and a bottom post 44 is changed. Therefore, displacement of a micromirror 45 can be changed. Very well-known comb-drives may give in-plane translation 46 to the multi-step inserter 42.

Figure 7A:
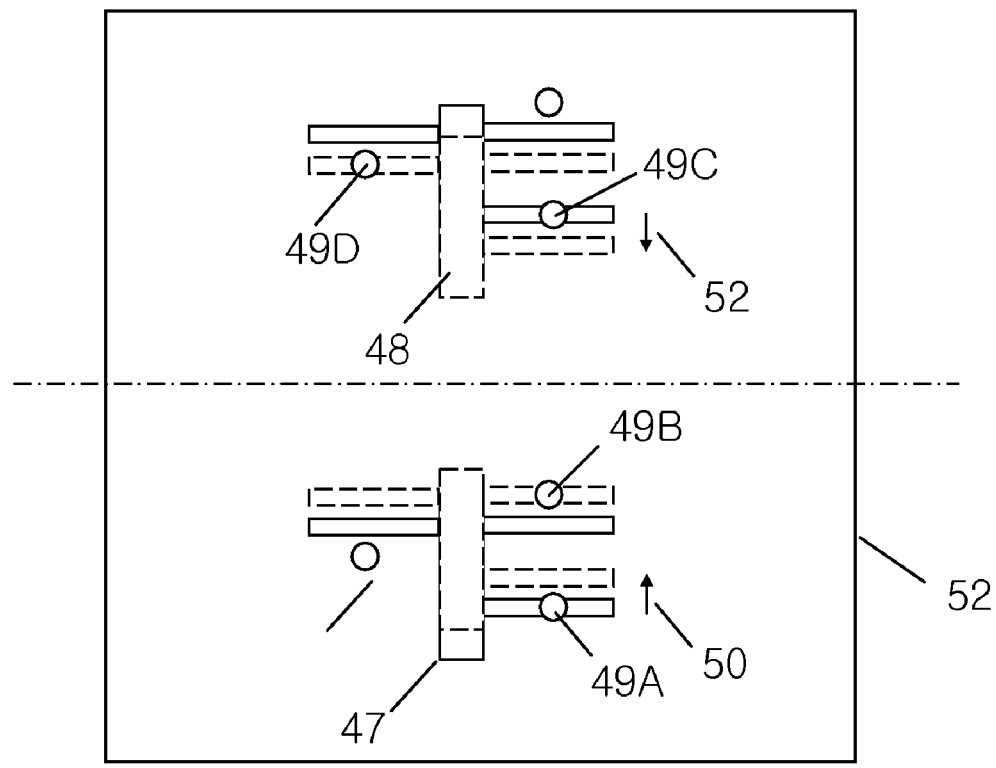
FIGS. 7a and 7b are schematic diagrams showing a multi-position support.
Figure 7B:
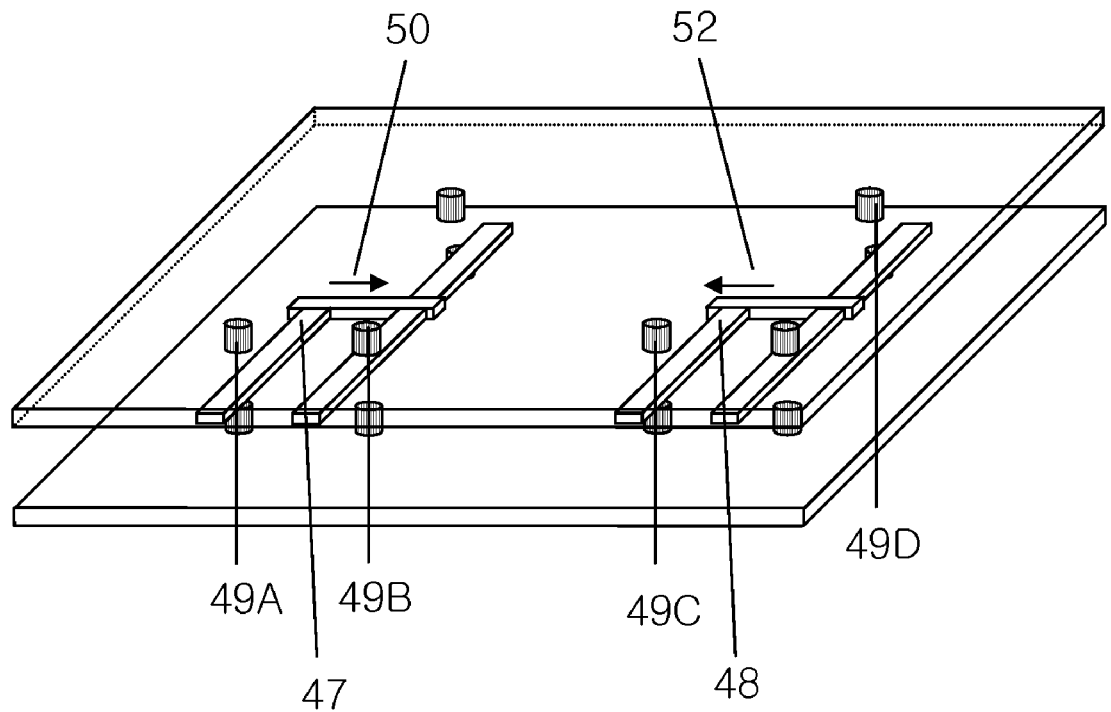

FIG. 7a shows a top view of multi-position support comprising the inserter 47, 48 and several posts 49 with different in-plane positions. FIG. 7b shows a three-dimensional drawing of the multi-position support to show the structure clearly. The supported position is changed by in-plane translation of the inserter 47, 48. For an example, the supporting position 49A of the micromirror 52 is changed to position 49B by in-plane translation 50 of the inserter 47. The supporting position 49C of the micromirror 52 is changed to position 49D by in-plane translation 51 of the inserter 48. Very well-known comb-drives may give the in-plane translation 50, 51 to the inserter 47, 48.

The supporting system combining the multi-position and the multi-step also can be used.

Figure 8:
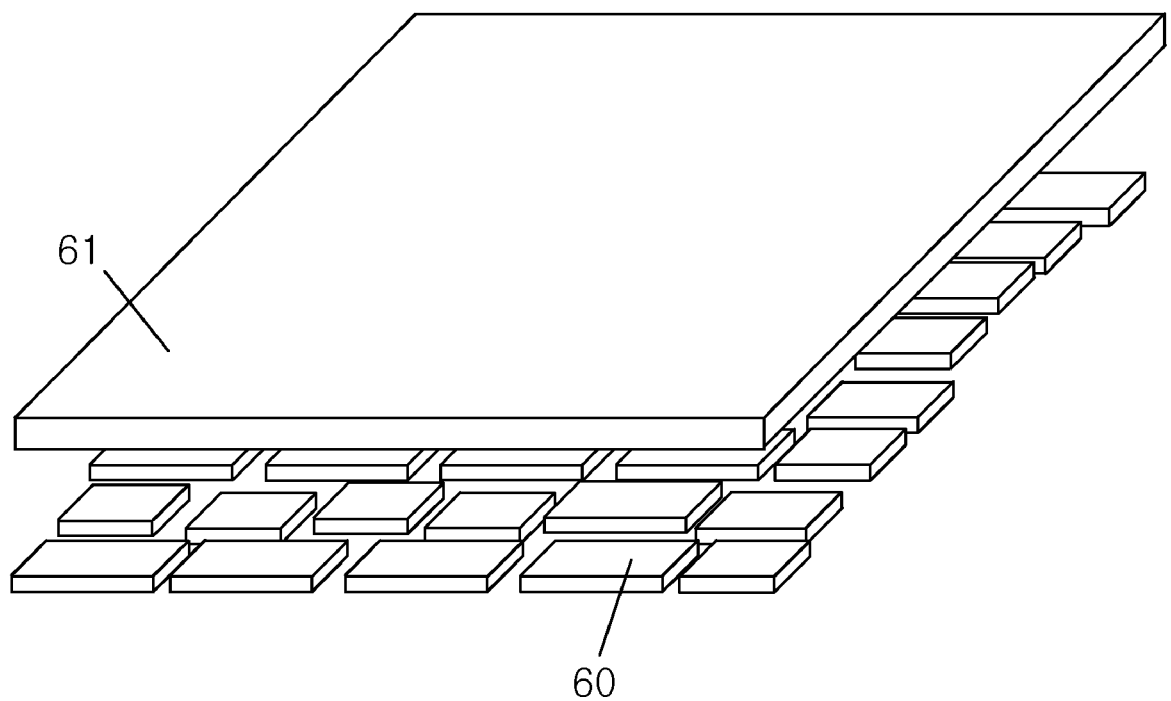
FIG. 8 is a schematic diagram showing the DCM comprising segmented electrodes.

FIG. 8 shows the second type of the DCM using segmented electrodes 60. In contrast with conventional electrostatic micromirrors, this embodiment comprises segmented electrodes 60 with different areas, positions, and discrete voltages. This embodiment has the same disadvantages as the conventional electrostatic micromirror except for compatibility with known microelectronics technologies for the control circuit. The micromirror 61 can have the desired three degrees of freedom by the appropriate combinations of segmented electrodes 60 with different areas, positions, and discrete voltages.

The VSDCM and the SEDCM can be fabricated by two different methods. The first method uses metals such as aluminum, nickel, gold, and copper for structural layer, and photoresist or $SiO_2$ for the sacrificial layers that form the air gaps. The fabrication of the DCM begins with a wafer on which a completed microelectronics addressable circuits are fabricated. A thick oxide is deposited over metal of the circuits and then planarized using known polishing methods such as chemical mechanical polishing (CMP) techniques and so on. The polishing step provides a completely flat surface for the digital structure. The CMP ensures that thickness variation, flatness, and reflectivity of micromirrors are not degraded. Through the use of several photomask layers, the structure of micromirrors is formed with metal layers for the spring, posts and, micromirror layer. And, the air gap of DCMs is formed with photoresist or $SiO_2$. A metal is sputter-deposited and plasma-etched by using plasma-deposited $SiO_2$ as the etch mask. Later in the packaging flow, the sacrificial layers are plasma-ashed to form the air gaps.

The second method uses known electroplating techniques. This method utilizes the unique sacrificial metallic mold that plays multiple roles of an electroplating mold for posts and seed layers for next-level electroplating at the same time. Therefore, this method can simplify the fabrication process and demonstrate real 3-D metallic microstructures without limitation on the number of levels. This method only uses conventional photolithography and electroplating, and known polishing such as CMP. As an example, electroplated nickel is used for structural layers and electroplated copper is used for sacrificial layers respectively.

The reflective surface of the micromirror is made of metal, metal compound, multi-layered dielectric material or other materials that have high reflectivity. Many known microfabrication processes can make the surface of the micromirror to have high reflectivity. The micromirrors are electrostatically controlled to have desired positions by actuating components. Depending on applications, a translation, a rotation, a translation and a rotation, or a translation and two rotations can be controlled.

The array comprising the DCM with two degrees of freedom rotations or two degrees of freedom rotations and one degree of freedom translation, which are controlled independently, can modulate incident lights arbitrarily. To do this, it is required that incident lights are deflected to the desired arbitrary directions by controls of two degree of freedom rotations or controls of two degree of freedom rotations and one degree of freedom translation. Independent translation of each micromirror is also required to adjust the phase of light.

The micromirror array can correct aberration, which is caused by optical effects due to the medium between the object and its image or is caused by defects of a lens system that cause its image to deviate from the rules of paraxial imagery, by controlling each micromirror independently.

Electric circuits to operate the micromirrors can be made with known the microelectronics circuits technologies where are used in microelectronics. Applying the microelectronics circuits under micromirror array, the effective reflective area can be increased by removing necessary area for electrode pads and wires. Independent control of each micromirror is also possible by making electric circuits required for control with known microelectronic circuit technologies. To increase optical efficiency, the microelectronics circuit is fabricated underneath the micromirrors by using known microfabrication methods.

The variable supports and the microelectronics circuits are positioned beneath the micromirror so that no reflective service area is lost to these features. This means that individual micromirror assemblies can be placed closer to each other in order to maximize the effective area.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A Discretely Controlled Micromirror (DCM) array comprising:
   a) a plurality of micromirrors are mounted in side-by-side array to define a spatial light modulator; and
   b) a plurality of segmented electrodes;
   wherein each of the micromirror has three degrees of freedom motion by combinations of segmented electrodes with different areas, positions, and discrete voltages, and
   wherein the applied voltage to the segmented electrodes is digital and/or discrete and
   wherein the one degree of freedom tranlslation of the DCM is controlled to retract or elevate to lengthen or shorten the optical path of an image reflected to remove phase aberration from image.

2. The DCM array of claim 1, wherein the DCM is controlled by electrostatic force.

3. The DCM array of claim 2, wherein the electrostatic force is controlled by digital and/or discrete voltage operation.

4. The DCM array of claim 1, wherein the segmented electrodes are located under the micromirror.

5. The DCM array of claim 1, wherein in-plane positions of the segmented electrodes are changed.

6. The DCM array of claim 1, wherein the areas of the segmented electrodes are changed.

7. The DCM array of claim 1, wherein the surface material of the micromirror is the one with high reflectivity.

8. The DCM array of claim 1, wherein the surface material of the micromirror is metal.

9. The DCM array of claim 1, wherein the surface material of the micromirror is metal compound.

10. The DCM array of claim 1, wherein the surface of the micromirror is made with multi-layered dielectric coating.

11. The DCM array of claim 1, wherein the DCM is made by a method in which the material of structural layer is metal.

12. The DCM array of claim 11, wherein an aluminum layer is sputter-deposited and plasma-etched using plasma-deposited $SiO_2$ as an etch mask.

13. The DCM array of claim 11, wherein the material of a sacrificial layer that forms air gaps is a photoresist.

14. The DCM array of claim 11, wherein the DCM is made by a method in which layers deposited by microfabrication proton are planarized using a chemical mechanical polishing (CMP) technique.

15. The DCM array of claim 11, wherein the micromirror is fabricated using electroplating techniques.

16. The DCM array of claim 15, wherein the electroplating technique uses the unique sacrificial metallic mold, which plays multiple roles of an electroplating mold for posts and seed layers.

17. The DCM array of claim 15, wherein electroplated nickel is used for structural layers.

18. The DCM array of claim 15, wherein electroplated copper is used for sacrificial layers.

19. The DCM array of claim 1, wherein the micromirrors are controlled independently.

20. The DCM array of claim 1, wherein the micromirrors are mounted in side-by-side array.

21. The DCM array of claim 1, wherein the one degree of freedom rotation of the DCM is controlled to scan a field of regard.

22. The DCM array of claim 1, wherein the two degrees of freedom rotation of the DCM is controlled to scan a field of regard.

23. The DCM array of claim 1, wherein the one degree of freedom rotation of the DCM is controlled to scan a field of regard, which the DCM can also retract or elevate to lengthen or shorten the optical path of an image reflected to remove phase aberration from image.

24. The DCM array of claim 1, wherein the two degrees of freedom rotation of the DCM is controlled to scan a field of regard, which the DCM can also retract or elevate to lengthen or shorten the optical path of an image reflected to remove phase aberration from image.

25. The DCM array of claim 19, wherein a control circuitry is constructed under the micromirror using microelectronics technologies.

26. The DCM array of claim 25, wherein a thick oxide is deposited over metal of the microelectronics circuits.

* * * * *